United States Patent [19]

Larsson et al.

[11] Patent Number: 5,816,003
[45] Date of Patent: Oct. 6, 1998

[54] CLEAN-ROOM WALL

[75] Inventors: Bertil Larsson, Tyresö, Sweden; Walter Åberg, Masaby, Finland

[73] Assignee: ABB Flakt AB, Stockholm, Sweden

[21] Appl. No.: 681,486

[22] Filed: Jul. 23, 1996

Related U.S. Application Data

[63] Continuation of Ser. No. 170,252, filed as PCT/SE92/00465, Jun. 24, 1992, abandoned.

[30] Foreign Application Priority Data

Jul. 1, 1991 [SE] Sweden .................................. 9102037

[51] Int. Cl.⁶ ...................................................... E04B 2/74
[52] U.S. Cl. .................................. 52/281; 52/241; 52/476; 52/656.1; 160/135
[58] Field of Search ..................................... 52/36.5, 36.6, 52/238.1, 239, 240, 241, 281, 282.1, 282.4, 204.591, 204.597, 656.1, 476; 160/135, 351

[56] References Cited

U.S. PATENT DOCUMENTS

| | | | |
|---|---|---|---|
| 3,417,537 | 12/1968 | Wilson | 52/731.1 X |
| 3,451,183 | 6/1969 | Lespagnol et al. | 52/656.1 |
| 3,555,760 | 1/1971 | Wastian | 52/656.1 |
| 3,559,357 | 2/1971 | Lowe | 52/656.1 X |
| 3,566,561 | 3/1971 | Tozer | 52/656.1 X |
| 3,700,385 | 10/1972 | Sherwood | 52/36.6 |
| 4,035,972 | 7/1977 | Timmons | 52/241 |
| 4,638,606 | 1/1987 | Wendt | 52/36.6 |
| 4,689,930 | 9/1987 | Menchetti | 52/468 X |
| 4,903,454 | 2/1990 | Rose | 52/489.1 |
| 4,984,400 | 1/1991 | Bockmiller | 52/241 |
| B1 3,527,010 | 6/1984 | Brzezinski | 52/397 X |

FOREIGN PATENT DOCUMENTS

| | | | |
|---|---|---|---|
| 0438951 | 7/1991 | European Pat. Off. | 52/239 |
| 3250135 | 11/1991 | Japan | 52/239 |
| 8701032-8 | 10/1988 | Sweden . | |

*Primary Examiner*—Winnie S. Yip
*Attorney, Agent, or Firm*—Oblon, Spivak, McClelland, Maier & Neustadt, P.C.

[57] ABSTRACT

A clean-room wall including vertically extending wall profile members (2,4,6) against which one or several wall panels (10) are mounted. In their sides, facing the interior (14) of the room, the profiles are formed substantially parallel with the wall extending flanges (8) against which the wall panel is arranged from the outside, as seen from the interior of the room. Fastening mechanisms (12) are arranged at the outside of the wall panel for fastening of the panel to the profile flange members.

5 Claims, 3 Drawing Sheets

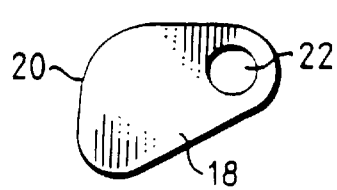
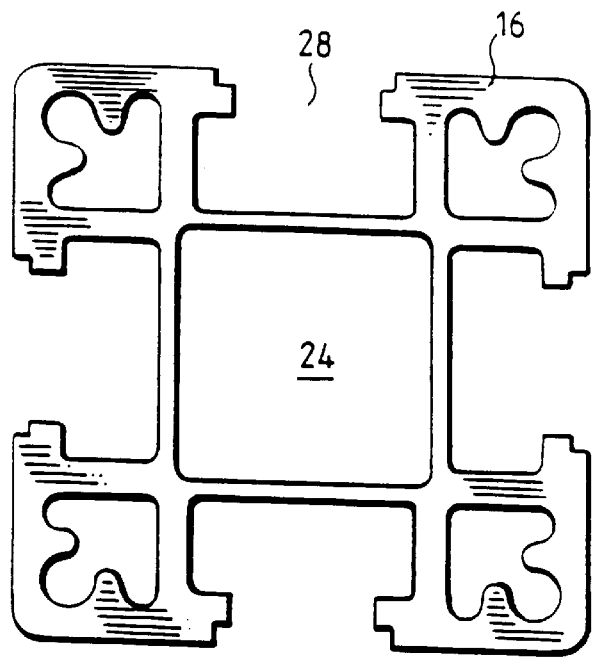
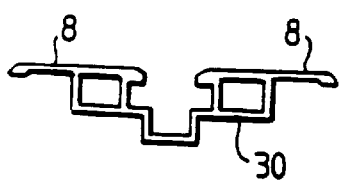
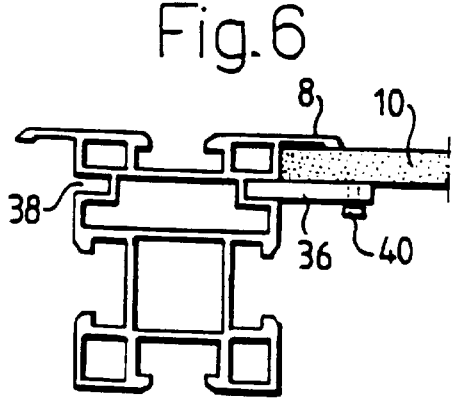
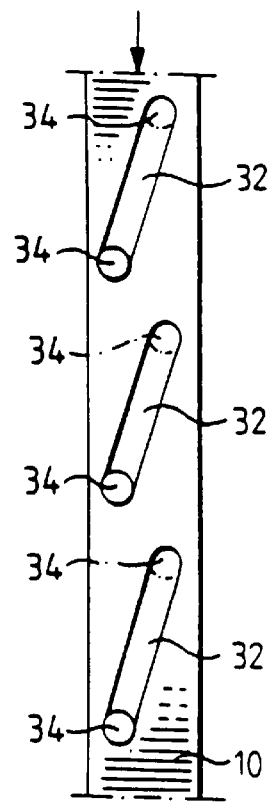

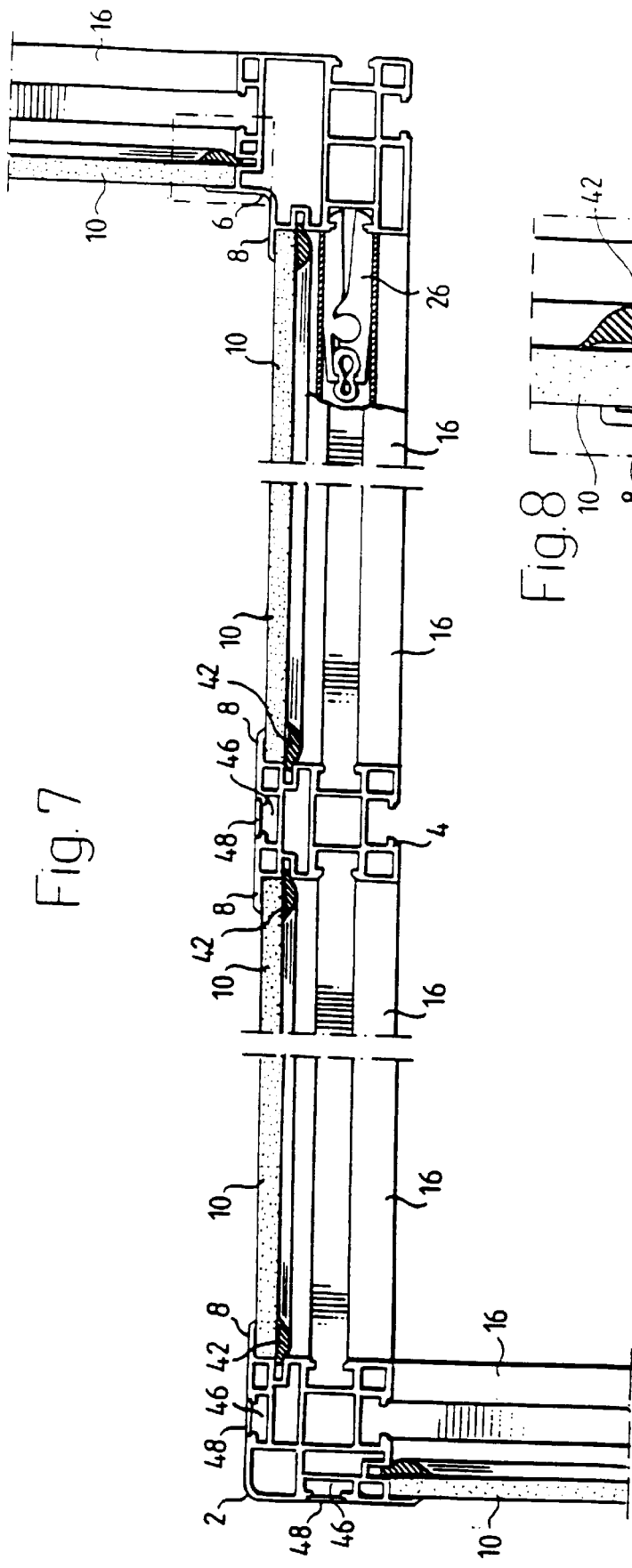

CLEAN-ROOM WALL

This application is a Continuation of application Ser. No. 08/170,252, filed on Apr. 18, 1994, now abandoned which was filed as PCT/SE92/00465 on Jun. 24, 1992.

TITLE OF THE INVENTION

1. Technical Field

This invention refers to a clean-room wall, comprising vertically projecting wall profile members, against which one or several wall panels are mounted.

2. Background Art

Within the clean-room technique it is desired to have substantially smooth interior room walls.

Another desire is that the clean-room walls should be easily mountable and dismountable for quick and simple alteration of the clean-rooms and their division.

DISCLOSURE OF INVENTION

The object of the present invention is to provide a clean-room wall which complies with the above mentioned demands.

This object is achieved with a clean-room wall as defined above with the features of the present invention.

Further advantages with the clean-room wall according to the invention are that the wall panels are mounted from the outside, seen from inside the room, i.e. firstly the panel is placed against the wall profile members from the outside, whereupon it is locked against the wall profile at an outside portion thereof. With the clean-room wall according to the invention, in addition, separate wall panels can easily be removed and be mounted, respectively, without affecting the remaining parts of the wall, i.e. parts of a wall can be mounted or dismounted without having an effect on the remaining parts of the walls of the room.

According to an advantageous embodiment of the wall according to the invention, the flanges, against which the wall panel is supposed to abut, can be formed on a detachably mounted part on the remaining part of the wall profile member. As a result such parts provided with flanges can be mounted on presently existing wall profile members in order to allow the erection of clean-room walls according to the present invention while using presently known framework profile members. Such detachably mounted flange parts also make mounting of cross profile members more easy, to accomplish because they can simply be cut off to a small extent in order to provide space for anchorage of the cross profile members in the vertical wall profiles.

The cross profiles are suitably anchored in the vertical wall profiles with a locking means of the kind disclosed in Swedish patent 8701032-8.

According to a further advantageous embodiment of the means according to the invention, the wall is sealed with a gasket arranged between a profile flange and a wall panel, against which gasket the panel is pressed.

According to another advantageous embodiment of the wall according to the invention the clamping means for the panels comprise eccentric means which are fastenable with screws in the cross profiles, arranged to press the wall panel from the outside against the profile flanges. The eccentric means are suitably designed with an outer curved surface for abutting the panel. This fastening means allows in a simple manner fastening of panels of different thickness against the wall sides.

According to still another advantageous embodiment of the wall according to the invention, the fastening means comprise grooves arranged at the edge of the panel, which grooves are extending obliquely in view of the plane of the panel, and protruding means mounted in the profiles, arranged to be inserted in the grooves, so that the panel will be fastened against the profile flanges by displacement of the wall panels with said protruding means sliding in the grooves. Suitably, the grooves are formed obliquely in the vertical side edges of the wall panels, and the protruding means, e.g. bolts, are provided in the surfaces of the profile members facing towards the side edges of the panel, such that the protruding means are inserted in the lower part of the grooves, whereupon the wall is pressed downwards while the protruding means slide in the grooves up to their upper part, whereby the wall panel at the same time is moved laterally into abutment with the wall profiles.

According to other advantageous embodiments of the means according to the invention the fastening means comprise spring steel designed in a suitable way, or gaskets provided at the outside of the wall panel, whereby a vibration-dampening fastening of the wall panels at the profiles is obtained.

According to still another advantageous embodiment of the wall according to the invention, the wall profile members have a groove oriented towards the room, in which supports for carrying shelves and other equipment in the clean-room can be fastened. The grooves not in use are suitably covered with a cover strip, so that a smooth inner surface of the wall is obtained.

BRIEF DESCRIPTION OF THE DRAWINGS

Embodiments of the clean-room wall according to the invention, chosen as examples, will now be described greater in detail with reference to the accompanying drawings, in which:

FIG. 2 shows in detail one embodiment of the design of the eccentric means of the fastening means for the wall panels used according to FIG. 1, FIG. 3 shows an embodiment of wall profiles, suitable for use as cross profiles at the clean-room wall according to the invention, FIG. 4 shows a separate part with profile flanges, against which the wall panels are to be attached, which part is meant to be mounted detachably on the rest of the wall profile, FIG. 5 shows an alternative embodiment for fastening of the wall panels on the profile members, FIG. 6 shows a further example of means for fastening the wall panel, FIG. 7 shows clean-room walls corresponding to FIG. 1 with an alternative embodiment of the fastening means for the walls, and FIG. 8 shows one detail of the fastning of the wall panel to the profile member according to the embodment according to FIG. 7.

BEST MODE FOR CARRYING OUT THE INVENTION

Figure 1:
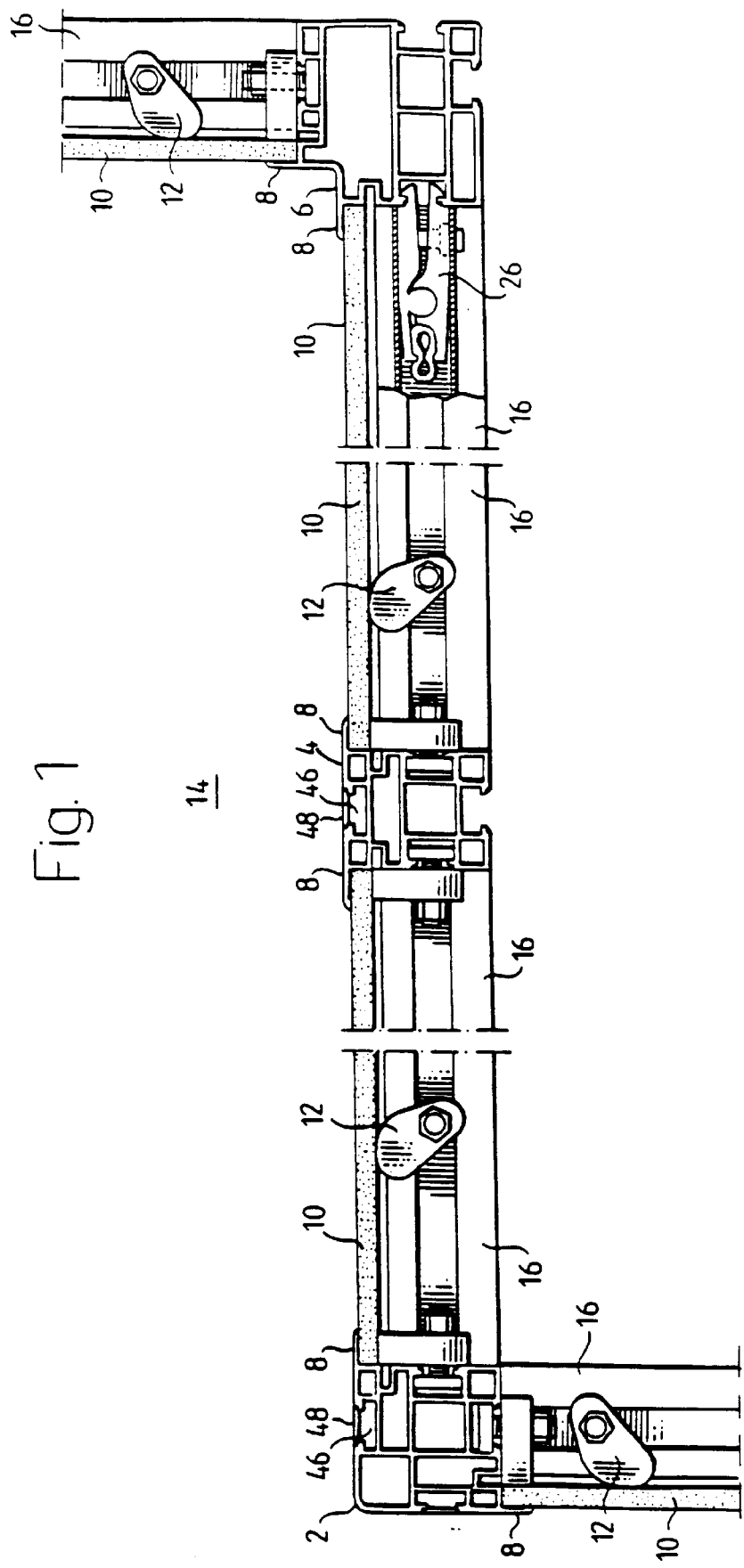
FIG. 1 is a view from above shows a first embodiment of the clean-room walls according to the invention.

In FIG. 1 a wall construction for a clean-room according to the invention is shown in a view taken from the above.

The walls comprise vertically extending wall profile members 2,4,6. In FIG. 1 different embodiments of these profile members are shown for different uses in the wall construction. Thus at 2, a profile members for an outside corner of the wall structure is shown, and at 4, an embodiemnt of a profile member intended to be used in an even wall is shown, and at 6, a profile member of an embodiment for an inner corner in the wall construction is shown.

The profile members 2,4,6 are, on the sides facing towards the inside of the room, provided with flanges 8, extending substantially in parallel with the wall, against which wall panels 10 are attached.

Mounting of the walls takes place in the following way.

The vertically extending profile member 2,4,6 are fastened at their upper and lower ends. Thereafter the wall panels 10 are placed against the flanges 8 and are fastened with suitable fastening means or member 12. The advantages with this structure is that the mounting of the walls takes place from the outside, as seen from the interior part 14 of the room, and the inside of the wall panels 10 together with the flanges 8 form a substantially smooth interior wall surface.

In the embodiment shown in FIG. 1 the fastening means 12 consist of eccentric means 18, fastened with screws in horisontally extending cross profiles 16, see FIG. 2.

The eccentric means 18 is formed with an outwardly curved surface 20, intended to abut the outside of the wall panel. The eccentric 18 is further intended to be fastened with screws through the hole 22 to the groove facing upwardly in the cross profile 16. The advantage with this fastening means is that it is easy to assemble and the same eccentric means 18 can be used for fastening of wall panels having different thicknesses.

In FIG. 3 is shown an example of a profile, which is suitable for use as cross bar at the clean-room wall according to the invention. The cross profile 16 is mounted on the vertical wall profiles 2,4,6 with the aid of locking means engaging the central cavity 24. The locking means 26 is schematically shown in FIG. 1 and can be of the kind disclosed in Swedish patent 8701032-8.

The eccentric means 18 is fastened with screws in the suitably upwardly oriented groove 28 of the cross profile 16 for locking of the wall panels 10.

The cross profiles 16 can, besides acting as stabilizing bars for the wall structure, support e.g. windows in the wall.

In FIG. 4, the profile flange member 8 are shown in a separate detail 30, which can be detachably mounted at the remainder of a wall profile. With such a profile part member 30, e.g. earlier existing wall profiles can be complemented such that a clean-room wall according to the invention can be erected. By such a fastening with screws of the profile part member 30 in a profile of e.g. the kind shown in FIG. 3, one gets a resulting wall profile, which is useful for a wall structure according to the invention. By using a separate profile part 30 for the profile flanges 8 mounting of cross profiles is simplified. By simply cutting the profile part member 30 somewhat shorter than the remainder of the wall profile member, openings are provided in a simple way to the wall profile members for the locking means 26 for locking of the cross profile members.

In FIG. 5 is shown an alternative embodiment of the fastening means, comprising obliquely, in view of the panel plane, extending grooves 32 arranged at the edge of the panel. The grooves 32 are suitably formed in the vertical side edges of the wall panel 10. In the surface of the wall profile facing these side edges corresponding protruding means 34 are arranged, e.g. in the form of bolts, pins or the like, so that they will be inserted in the lower part of the grooves upon mounting of the wall panels 10, whereupon the wall panel is pressed downwardly and the protruding means 34 will slide in the grooves 32, which are so tilted that the wall panel 10 hereby is pressed laterally against the profile flanges 8.

One further alternative embodiment of the fastening means is shown in FIG. 6. Hereby a locking plate 36 is fitted in the groove 38 in the wall profile member at the outside portion of the wall panel 10. In the locking plate 36 a through bolt 40 is threaded, with which the panel 10 is fastened against the flange 8.

The fastening means can also be formed as springs, which clamp the panel against the profile flange member. Thus the fastening means can be formed as a spring steel, mounted in the groove 38, which spring steel is curved in a suitable way so that it will clamp the wall panel 10 against the flange 8.

In FIG. 7 a similar wall structure as in FIG. 1 is shown with an alternative embodiment of the fastening means. In this embodiment a specially designed gasket 42 is used, the one side of which is inserted into the groove 38 and the other end part of which press the wall panel 10 against the flange 8. This embodiment as well as the above mentioned spring embodiment provides a vibration-damping fastening of the wall panel 10.

In all the embodiments a gasket 44 is arranged between the flange 8 and the inside of the wall panel 10, (see FIG. 8).

The wall profile members 2,4,6 are formed with a groove 46 facing towards the interior 14 of the room for supporting shelves and other equipment for the work in the clean-room 14. Those grooves 46 or those parts of the grooves 46, which are not used are suitably covered with a cover strip 48, such that a substantially even inner surface at the inside of the wall is obtained.

Examples of embodiments of the clean-room wall according to the invention have been described above. Of course many variations and modifications are possible within the scope of the invention. Thus it is possible in order to lock the wall panels to the wall profile members with different arrangements of wedges, whereby cooperating surfaces optionally can be designed as friction surfaces in order to counteract any tendency of the wedges to be released because of vibrations in the wall.

We claim:

1. A wall assembly for a room, which comprises:
    a plurality of elongated wall profile members, at least one wall panel being removably mounted between said wall profile members;
    a plurality of flanges connected to said wall profile members, said flanges extending outwardly from said wall profile members and supporting said wall panel wherein the wall profile members are located on a first side of the wall panel and said wall panel is located substantially parallel to said flanges; and
    a plurality of fastening members connected to the wall profile members, said fastening members fastening the wall panel to the flanges wherein the wall profile members include vertical wall profile members and substantially horizontally extending cross wall profile members which are arranged between the vertical wall profile members and wherein the fastening members comprise eccentric members exteriorly and rotatably connected to the cross wall profile members and pressing the wall panel against the flanges.

2. A wall according to alaim 1, wherein the eccentric members are formed with an outwardly curved surface which bears on the wall panel.

3. A wall according to claims 1 or 2, wherein the wall profile members have a groove formed therein for supporting shelves or equipment.

4. A wall according to claim 1, wherein the flanges are detachably mounted on the wall profile members.

5. A wall assembly for a room, which comprises:

a plurality of elongated wall profile members to which at least one wall panel is mounted;

a plurality of flanges connected to said wall profile members, said flanges supporting said wall panel wherein the wall profile members are located on a first side of the wall panel and said wall panel is located substantially parallel to said flanges; and a plurality of fastening members connected to the wall profile members, said fastening members fastening the wall panel to the flanges wherein the fastening members comprise eccentric fastening plates rotatably attached to the profile members and pressing locking screws locking the wall panel against the flanges.

* * * * *